July 16, 1968  C. F. ALBAN ET AL  3,392,583
LAMINATED HUMIDITY RESPONSIVE ELEMENT HAVING IMPROVED
WATER VAPOR ABSORPTIVE QUALITIES
Filed July 11, 1967

INVENTORS
CLARENCE F. ALBAN
CHARLES C. PERRY
BY
Olsen and Stephenson
ATTORNEYS

United States Patent Office 3,392,583
Patented July 16, 1968

3,392,583
LAMINATED HUMIDITY RESPONSIVE ELEMENT HAVING IMPROVED WATER VAPOR ABSORPTIVE QUALITIES
Clarence F. Alban, Detroit, and Charles C. Perry, Ann Arbor, Mich., assignors to W. M. Chace Company, Detroit, Mich., a corporation of Delaware
Filed July 11, 1967, Ser. No. 652,438
6 Claims. (Cl. 73—337)

ABSTRACT OF THE DISCLOSURE

A multilayer laminated element provided with at least one lamination formed of a material which will absorb water vapor and which has a relatively high coefficient of linear hygroscopic expansion wherein this lamination is provided with a coarse uneven outer surface to enhance the ability of the element to absorb water vapor and thus reduce the response time of the element to changes in ambient humidity conditions.

Cross reference to related applications

This invention relates to improvements in laminated elements of the type shown in applicants' prior copending applications Ser. No. 404,221, filed Oct. 16, 1964, Ser. No. 404,260, filed Oct. 16, 1964 and Ser No. 408,834, filed Nov. 4, 1964.

Background of the invention

This invention relates to substantially any laminated element which is intended to respond to changes in ambient humidity conditions. Examples of such elements are illustrated and described in the aforementioned patent applications. Application Ser. No. 404,221 discloses a humidity responsive element with a plastic lamination, application Ser. No. 404,260 discloses a temperature compensated humidity responsive element and application Ser. No. 408,834 discloses an element which is responsive to both humidity and temperature changes in the ambient environment. Hygrometric elements are well known in room humidistats and the like and are sometimes formed of a paper layer bonded to a metallic layer. U.S. Patent No. 3,306,108 illustrates another form of this element in which the water vapor responsive lamination is formed of porous glass.

Summary of the invention

One of the principal problems in elements of the above-described type is the objectionable slow response time of the element to changes in ambient humidity conditions. The element of this invention provides an improved response time by enhancing the ability of the lamination having the high coefficient of linear hygroscopic expansion to absorb water vapor quickly. This is accomplished in the element of this invention by forming the outer exposed surface of this lamination so that it is of an uneven and coarse character to thus increase the area of its exposed surface. It has been found that such a surface improves the ability of the water vapor absorbing lamination to respond quickly to changes in ambient humidity conditions.

Another problem involved in the manufacture of laminated elements of the type to which this invention relates is the problem of securing the water vapor absorbing lamination to the adjacent lamination so that these laminations will act as an integral whole. In one embodiment of this invention, this problem is solved by forming the water vapor absorbing lamination of a plastic material, and forming holes extending through the remaining laminations. The plastic lamination is applied while it is in a heated condition so that portions of the plastic lamination are extruded into the openings in the other laminations. By forming the openings of an increasing cross sectional size in a direction extending away from the plastic layer, a mechanical interlock of the plastic layer and the remaining laminations is obtained. A roller or the like can be used to press the plastic lamination into the adjacent lamination and the roller surface can be formed with projections which form indentations in the plastic layer to achieve the desired coarse character of the exposed surface of the plastic lamination. By roughening the roller, the heated plastic in the plastic lamination will tend to adhere to the roller so that the roller will leave fiberlike projections on the exposed surface of the plastic layer. The desired treatment of the exposed surface on the plastic layer is thus obtained simultaneously with the attachment of the plastic laminations to the other laminations in the element.

It is an object of this invention, therefore, to provide an improved humidity responsive laminated element.

Further objects, features and advantages of this invention will become apparent from a consideration of the following description, the appended claims, and the accompanying drawing in which:

Figure 1:
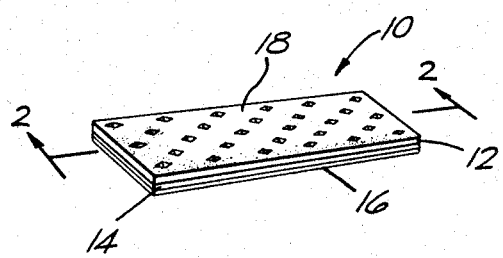
FIGURE 1 is a perspective view of one embodiment of the element of this invention.

With reference to the drawing, the laminated element of this invention, indicated generally at 10, is illustrated in FIG. 1, as consisting of three laminations or layers 12, 14 and 16, although it is to be understood that this invention can be incorporated in any humidity responsive element consisting of two or more layers. The laminations 12, 14 and 16 are arranged in a sandwich form and contiguous surfaces of adjacent layers are secured together so that the element 10 will act as an integral whole. In the illustrated embodiment of the invention, the layers 14 and 16 are formed of suitable metals having different coefficients of thermal expansion. The humidity responsive layer 12 is illustrated as being formed of a plastic material having hygroscopic characteristics. One material suitable for forming the lamination 12 is of a plastic of the nylon family, namely, Capran, a flexible thermoplastic film or sheet made by Allied Chemical Corporation, Chemical Division, Chicago, Ill., U.S.A.

Figure 2:
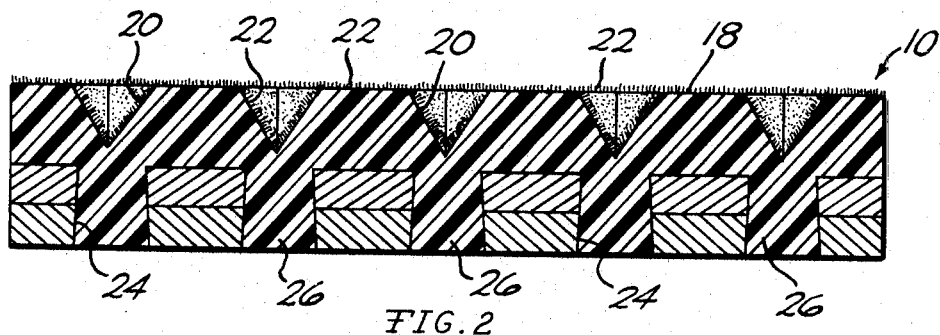
FIGURE 2 is a longitudinal sectional view of the element of this invention as seen from substantially the line 2—2 in FIG. 1.
Figure 3:
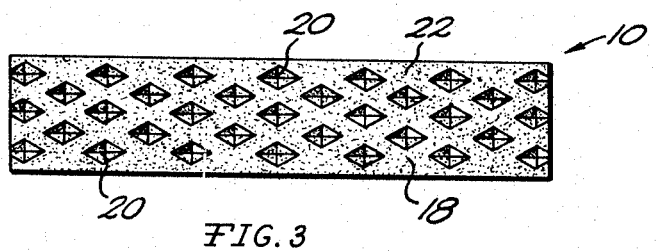
FIGURE 3 is a plan view of the element of this invention looking at the exposed surface of the water absorbing lamination.

As best appears in FIGS. 2 and 3, the lamination 12 has an outer exposed surface 18 which is formed with indentations 20 which effectively increase the area of the surface 18. The indentations 20 can be of the illustrated diamond shape or they can be of other suitable shapes such as continuous longitudinal grooves. The outer surface 18 is also formed with outwardly extending fiberlike projections 22 which also function to dramatically increase the effective area of the surface 18 and increase the ability of the laminaation 12 to absorb water vapor.

The surface 18 can be formed in any suitable manner. One method of forming the surface 18 is to subject it to the action of a coarse roller (not shown) while the lamination 12 is in a heated and thus softened condition. The roller is provided with diamond-shape bumps or projections which form the indentations 20, as the roller is passed over the surface 18 so as to subject the surface 18 to pressure. The roller has a coarse surface, which resembles the surface on a file, which results in the softened plastic in the lamination 12 adhering somewhat to the roller surface as the roller passes over the softened plastic.

The fiberlike projections 22 on the surface 18 result from the roller pulling up the plastic on the surface.

In one embodiment of the invention, the laminations 14 and 16 are formed with through openings 24, of frustrated cone shape, prior to assembly of the laminations 14 and 16 with the lamination 12. As shown in FIG. 2, the openings 24 are of an increasing cross sectional size in a direction away from the lamination 12. When the lamination 12 is subjected to the action of the above-described roller, portions 26 of the lamination 12 are extruded into the openings 24 so that the portions 26 form integral projections on the lamination 12, with the projections 26 being of a size and shape corresponding to the shape of the openings 24. This results in a mechanical interlock of the lamination 12 with the laminations 14 and 16 so as to effectively lock the laminations together so that they will act as an integral whole. In the illustrated embodiment of the invention the laminations 14 and 16 are formed of materials selected for their particular thermal coefficients of expansion and the laminations 12, 14 and 16 are dimensionally proportioned so that the element 10 will not deflect laterally in response to a change in ambient temperature. Consequently, the element 10 will deflect only in response to changes in ambient humidity conditions.

As a specific example, lamination 12 is a form of Capran, lamination 14 is a form of a metal having a relatively low coefficient of thermal expansion such as an alloy consisting essentially of 36% Ni—balance Fe, and lamination 16 is formed of a metal having a relatively high coefficient of thermal expansion such as an alloy consisting essentially of 22% Ni, 3% Cr, balance Fe.

From the above description, it is seen that this invention provides an element 10 which includes a lamination 12 having water absorptive qualities and in which the exposed surface 18 of the lamination 12 is of an uneven and coarse character so as to enlarge its exposed area. This improves the ability of the lamination 12 to exchange water vapor with the surrounding atmosphere due to humidity changes, thus reducing the response time of the element 10 to changes in ambient humidity conditions. In this invention the indentations 20 also provide channels from the exterior to the interior of the humidity responsive layer 12 to further enhance its water vapor exchange characteristics. The extension of the projections 26 through the laminations 14 and 16 so that the projections 26 are also exposed to the ambient environment also improves the response time of the element 10. In the illustrated embodiment of the invention, this improved response time is obtained concurrently with obtaining an improved attachment of the lamination 12 to the other laminations by virtue of the mechanical interlock obtained through the projections 26.

It will be understood that the laminated humidity responsive element having improved water vapor exchange qualities which is herein disclosed and described is presented for purposes of explanation and illustration and is not intended to indicate limits of the invention, the scope of which is defined by the following claims.

What is claimed is:

1. A laminated element for sensing changes in ambient humidity conditions wherein said element includes at least one metal lamination and a second lamination formed of a material which will absorb and release water vapor and which has a relatively high coefficient of linear hygroscopic expansion, said laminations being secured together in surface-to-suface contact so that the laminations act as an integral whole, said second lamination having an outer exposed surface which is of an uneven and coarse character so as to increase the surface area thereof and enhance the ability of said second lamination to exchange water vapor with the surrounding atmosphere.

2. A laminated element having the structure set forth in claim 1 wherein said coarse exposed surface has a plurality of indentations formed therein which form channels communicating the exposed surface of said second lamination with the interior thereof.

3. A laminated element having the structure set forth in claim 1 wherein said coarse surface has a plurality of outwardly extending fiberlike projections thereon.

4. A laminated element having the structure set forth in claim 1 wherein said coarse outer surface has indentations therein and outwardly extending fiberlike projections thereon.

5. A laminated element having the structure set forth in claim 1 wherein said metal lamination has a plurality of openings extended therethrough, and said second lamination has extensions thereon which project into said openings and are engaged with said metal lamination at said openings so as to secure said laminations together.

6. A laminated element having the structure set forth in claim 5 wherein said openings in said metal laminations are shaped so that the cross sectional size thereof increases in a direction extending away from said second laminations and said extensions on said second lamination are correspondingly shaped.

References Cited

UNITED STATES PATENTS

| 2,573,685 | 11/1951 | Blinn | 73—337 |
|---|---|---|---|
| 3,306,108 | 2/1967 | Harrington | 73—337 |
| 3,335,608 | 8/1967 | Alban | 73—337 |

DAVID SCHONBERG, *Primary Examiner.*

DENIS E. CORR, *Assistant Examiner.*